United States Patent
John Wilson et al.

(10) Patent No.: US 9,474,051 B2
(45) Date of Patent: Oct. 18, 2016

(54) ORDERING AND PROCESSING OF INTERFERING CHANNELS FOR REDUCED COMPLEXITY IMPLEMENTATION

(71) Applicant: QUALCOMM Incorporated, San Diego, CA (US)

(72) Inventors: Makesh Pravin John Wilson, San Diego, CA (US); Siddhartha Mallik, San Diego, CA (US); Yi Huang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 429 days.

(21) Appl. No.: 13/943,348

(22) Filed: Jul. 16, 2013

(65) Prior Publication Data
US 2014/0023002 A1     Jan. 23, 2014

Related U.S. Application Data

(60) Provisional application No. 61/673,693, filed on Jul. 19, 2012.

(51) Int. Cl.
*H04W 4/00*     (2009.01)
*H04W 72/04*     (2009.01)
(Continued)

(52) U.S. Cl.
CPC ......... *H04W 72/0406* (2013.01); *H04W 16/10* (2013.01); *H04W 72/1226* (2013.01); *H04L 1/1812* (2013.01); *H04W 52/281* (2013.01); *H04W 72/1257* (2013.01)

(58) Field of Classification Search
None
See application file for complete search history.

(56) References Cited

U.S. PATENT DOCUMENTS 8,908,657 B2 * 12/2014 Oizumi ............ H04W 72/0446
                                                    370/336
2010/0330919 A1   12/2010   Gurney et al.
(Continued)

FOREIGN PATENT DOCUMENTS

| WO | 2010018909 A1 | 2/2010 |
| WO | 2011052869 A1 | 5/2011 |
| WO | WO 2011052869 A1 * | 5/2011 |

OTHER PUBLICATIONS

Huawei et al: "Analysis of PCFICH performance issue and possible solutions," 3GPP Draft; R1-106166 Analysis of PCFICH Performance Issue and Possible Solutions, 3rd Generation Partnership Project (3GPP), Mobile Competence Centre ; 650, Route Des Lucioles ; F-06921 Sophia-Antipolis Cedex; France, vol. RAN WG1, no. Jacksonville, USA; 20101115-20101119, Nov. 9, 2010 (Nov. 9, 2010), XP050598863.

(Continued)

*Primary Examiner* — Christopher Crutchfield
*Assistant Examiner* — Thinh Tran
(74) *Attorney, Agent, or Firm* — Arent Fox PLLC

(57) ABSTRACT

A method, an apparatus, and a computer program product for wireless communication are provided. The apparatus may perform one or more process that enable smart processing of resource elements from interfering base stations in order to improve cell decoding. The method includes prioritizing resource elements in order to reduce complexity of processing of the interfering resource elements. Some resource elements may be excluded from processing if priority is set to a null value or to a sufficiently low value. Resource elements in a subframe received from an interfering transmitter are grouped into one or more target regions and paired with serving and interfering cells. Each pairing is prioritized and processed in an order based on the priorities assigned to the pairings.

52 Claims, 12 Drawing Sheets

(51) Int. Cl.
*H04W 16/10* (2009.01)
*H04W 72/12* (2009.01)
*H04W 52/28* (2009.01)
*H04L 1/18* (2006.01)

(56) References Cited

U.S. PATENT DOCUMENTS

| | | |
|---|---|---|
| 2012/0113812 A1 | 5/2012 | Ji et al. |
| 2013/0003680 A1 | 1/2013 | Yamamoto et al. |
| 2013/0028199 A1 | 1/2013 | Song et al. |
| 2013/0039193 A1 | 2/2013 | Yin et al. |
| 2013/0039284 A1* | 2/2013 | Marinier et al. ............. 370/329 |
| 2014/0031031 A1* | 1/2014 | Gauvreau ............. H04L 5/0053 455/426.1 |

OTHER PUBLICATIONS

International Search Report and Written Opinion—PCT/US2013/050942—ISA/EPO—Nov. 29, 2013.
LG Electronics: "SIC-based ICIC in heterogeneous network", 3GPP Draft; R1-100235 SIC Based ICIC in Heterogeneous Network Final, 3rd Generation Partnership Project (3GPP), Mobile Competence Centre; 650, Route Des Lucioles; F-06921 Sophia-Antipolis Cedex; France, vol. RAN WG1, no. Valencia, Spain; 20100118-20100122, Jan. 12, 2010 (Jan. 12, 2010), XP050597941.

* cited by examiner

ORDERING AND PROCESSING OF INTERFERING CHANNELS FOR REDUCED COMPLEXITY IMPLEMENTATION

CROSS-REFERENCE TO RELATED APPLICATIONS

This application claims the benefit of U.S. Provisional Application Ser. No. 61/673,693, entitled "ORDERING AND PROCESSING OF INTERFERING CHANNELS FOR REDUCED COMPLEXITY IMPLEMENTATION" and filed on Jul. 19, 2012, which is expressly incorporated by reference herein in its entirety.

BACKGROUND

1. Field

The present disclosure relates generally to communication systems, and more particularly, to a method for optimizing decoding in a wireless communication system.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be embodied in user equipment and may perform one or more processes that enable smart processing of resource elements (REs) from interfering base stations in order to improve serving cell decoding. The method includes prioritizing REs in order to reduce complexity of processing of the interfering REs. Some REs may be excluded from processing if priority is set to a null value or to a sufficiently low value. The prioritization scheme can optimize receiver performance.

In an aspect of the disclosure, a subframe is received that includes interference from at least one interfering transmitter. REs in the subframe are grouped into one or more sub-divisions or target regions (TRs) based on a criterion. TR-cell (TRC) pairs are generated, where each TRC pair associating a target region from the one or more TRs with one of the at least one interfering transmitter or a serving cell. Processing priorities are determined for the TRC pairs. Thereafter, TRs are processed in an order based on the processing priorities.

In an aspect of the disclosure, the TRC pairs may be generated by pairing each of the one or more TRs with each of the at least one interfering transmitter and the serving cell.

In an aspect of the disclosure, the TRC pairs may be generated by pairing each of the one or more TRs with one of the at least one interfering transmitter or the serving cell.

In an aspect of the disclosure, a highest processing priority of the processing priorities is assigned to a TRC pair having a TR that includes REs comprising a physical control format indicator channel.

In an aspect of the disclosure, a TR may comprise REs that are allocated for a physical downlink control channel, or a physical downlink shared channel. A TR may comprise REs that are allocated for a physical control format indicator channel.

In an aspect of the disclosure, processing priorities may be determined for the TRC pairs by initializing priorities for the one or more TRC pairs based on a first signal received from a first interfering transmitter or cell. The priorities for the one or more TRC pairs may be modified based on a second signal received from a second interfering transmitter or cell. In some aspects, priorities for the TRC pairs may be initialized by assigning priorities based on the presence or absence of the first signal in the one or more TRs. In one example, the first signal is associated with REs including one or more of a physical downlink control channel, a physical downlink shared channel, and a physical control format indicator channel. For example, if the first or second signal is associated with REs allocated for the PCFICH, the UE may initialize processing priorities for the TRC pairs by assigning a highest processing priority to a TRC pair having a TR that includes REs allocated for the PCFICH. The TR that includes REs allocated for the PCFICH may be associated with one of the interfering transmitters or the serving cell.

In some aspects, the priorities are initialized for TRC pairs based on a determination of relative power levels of the first signal and the second signal in the one or more TRs. The priorities of the TRC pairs may be modified based on a determination of differences in power levels between the first signal and the second signal in the TRs. The power levels may be associated with one or more of a physical downlink control channel, a physical downlink shared channel, and a physical control format indicator channel.

In an aspect of the disclosure, the priorities of the TRC pairs may be modified by assigning a higher priority to TRC pairs having TRs associated with a first interfering transmitter than the priority assigned to TRC pairs having TRs associated with a second interfering transmitter when a power level in the TRs associated with the first interfering transmitter is higher than a power level in the TRs associated with the second interfering transmitter.

In an aspect of the disclosure, selected TRs are processed by processing the TRs corresponding to the highest priority TRC. The processing priorities of remaining TRC pairs may be modified based on a result of the processing step. The processing priorities of the remaining TRC pairs may be modified by assigning a NULL priority to TRC pairs when the result of the processing step indicates an absence of a downlink grant. The processing priorities of the unprocessed TRC pairs may be modified by assigning a NULL priority to TRC pairs when the result of the processing step indicates an absence of one or more of a physical downlink control channel, a physical downlink shared channel, and a physical control format indicator channel, for the corresponding cell.

DETAILED DESCRIPTION

Figure 1:
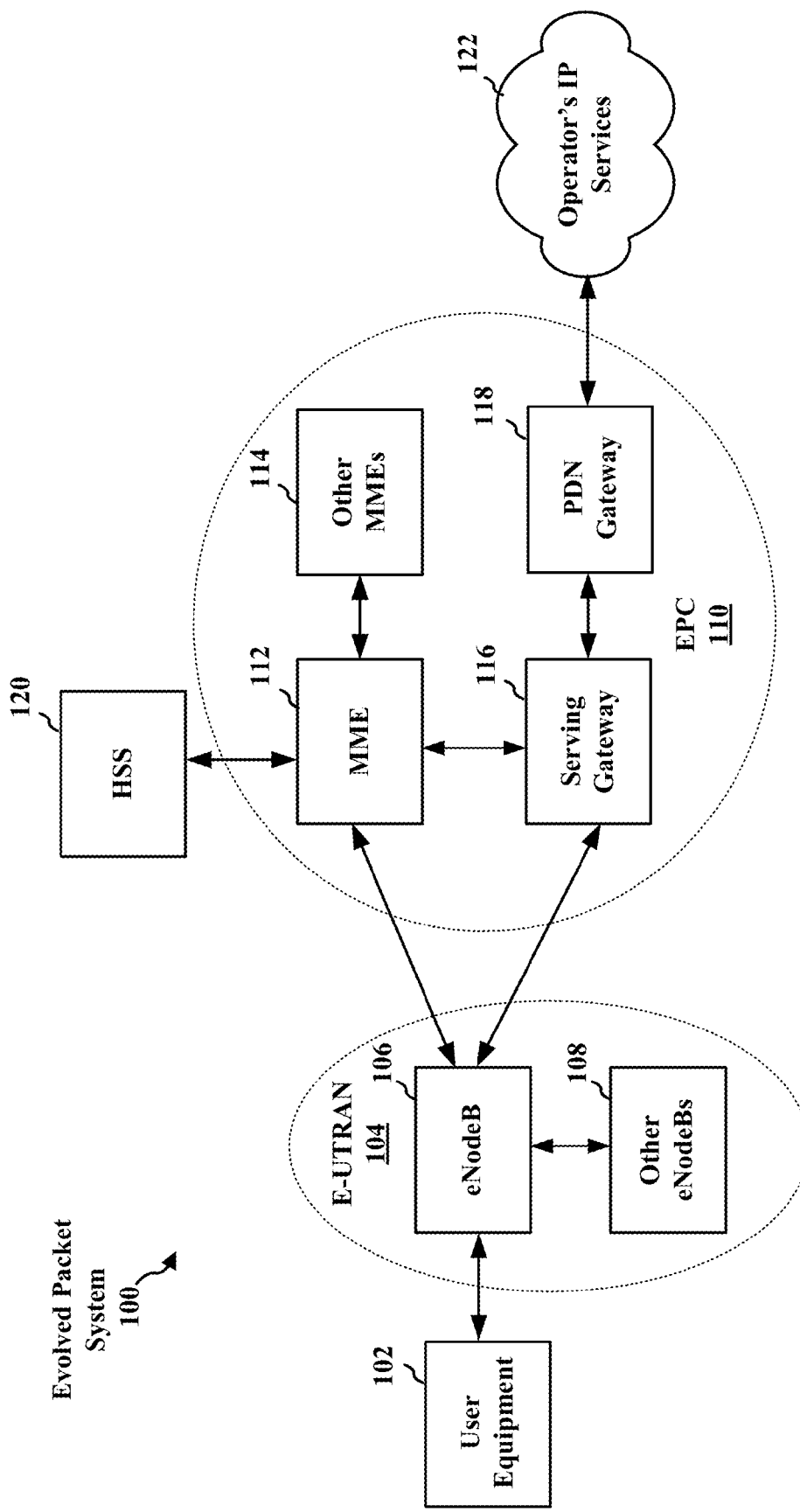
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
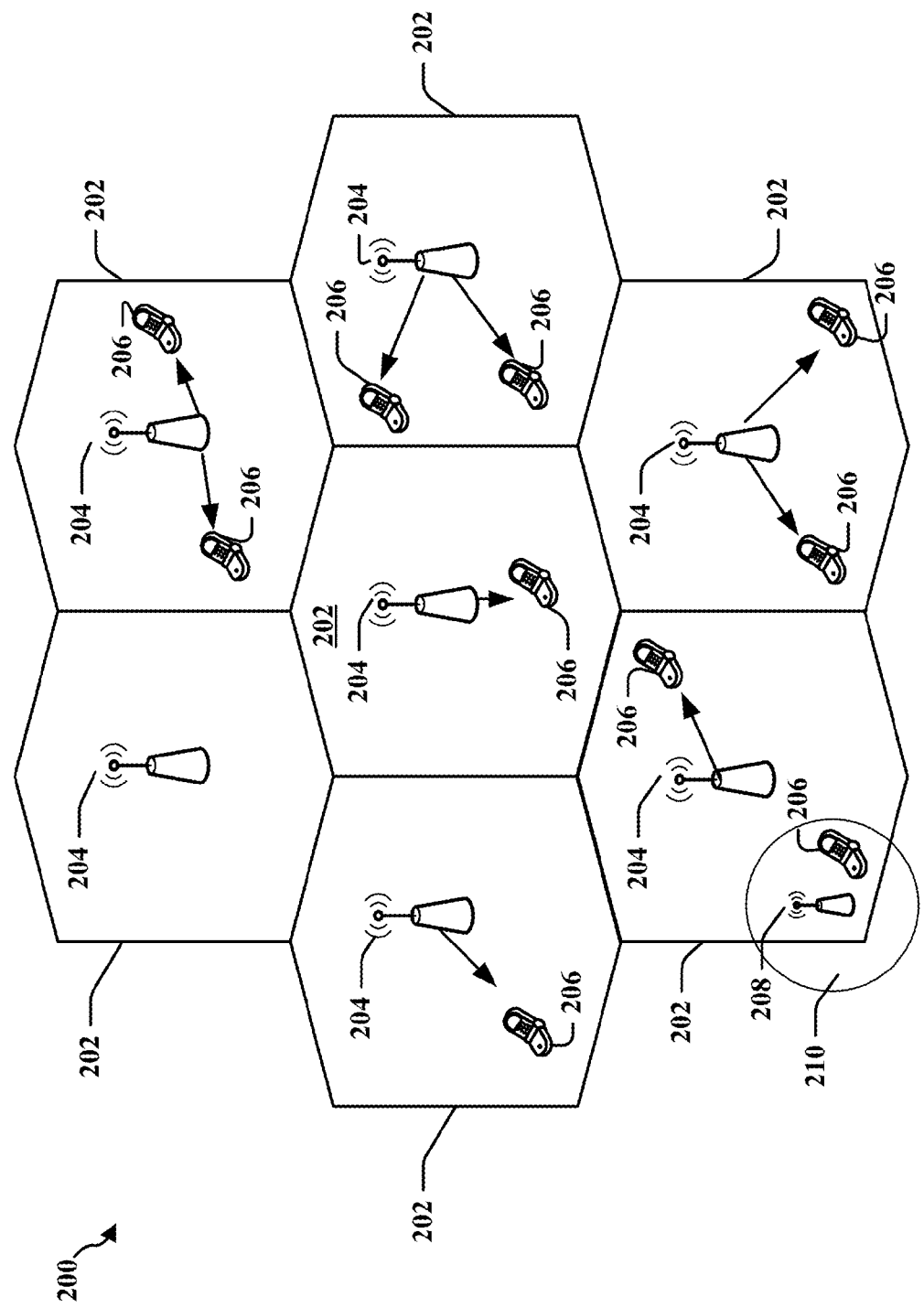
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
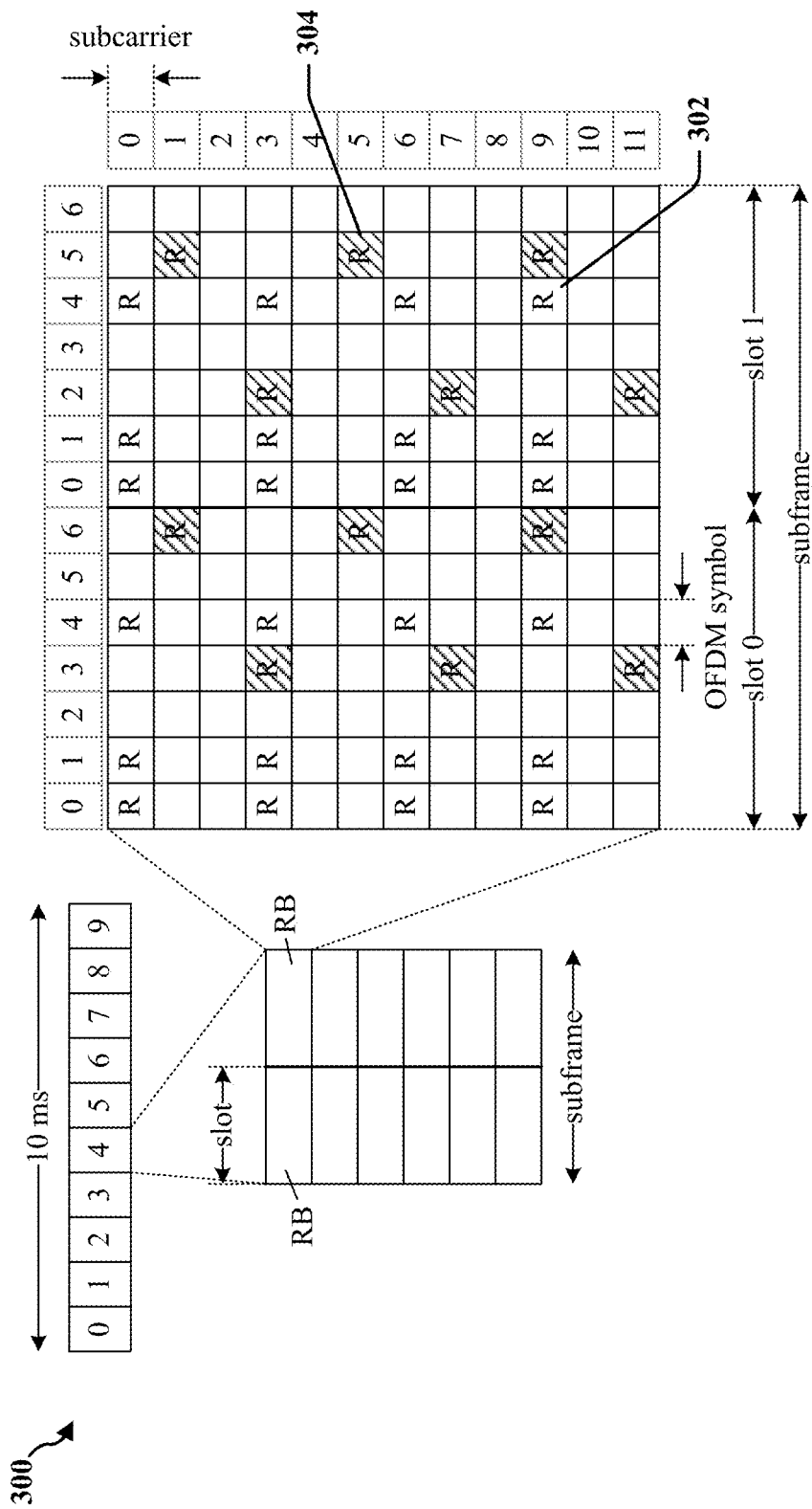
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple REs. In LTE, a resource block contains 12 consecutive subcarriers in the frequency domain and, for a normal cyclic prefix in each OFDM symbol, 7 consecutive OFDM symbols in the time domain, or 84 REs. For an extended cyclic prefix, a resource block contains 6 consecutive OFDM symbols in the time domain and has 72 REs. Some of the REs, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each RE depends on the modulation scheme. Thus, the more resource blocks that a UE receives and the higher the modulation scheme, the higher the data rate for the UE.

Figure 4:
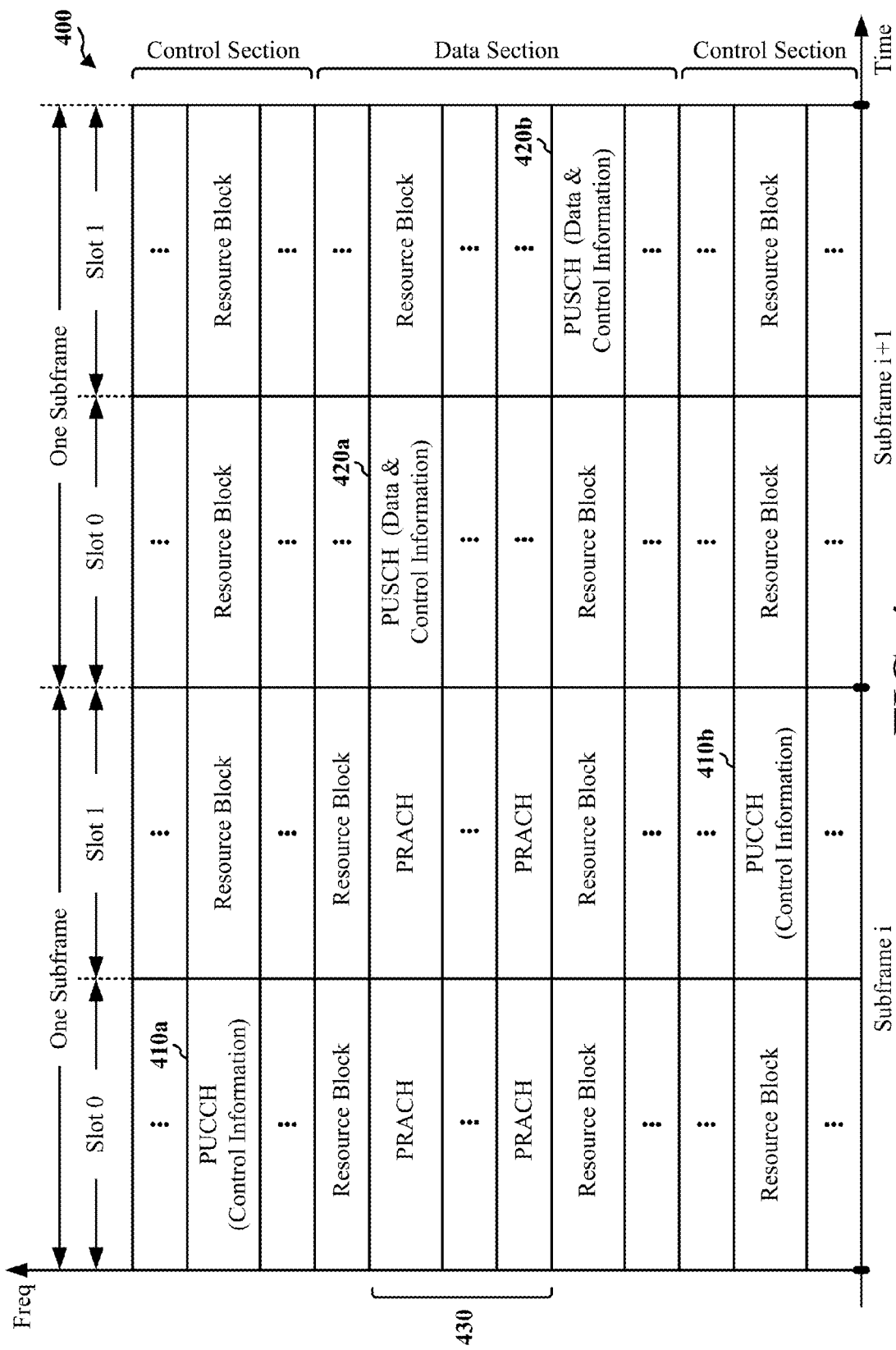
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size.

The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
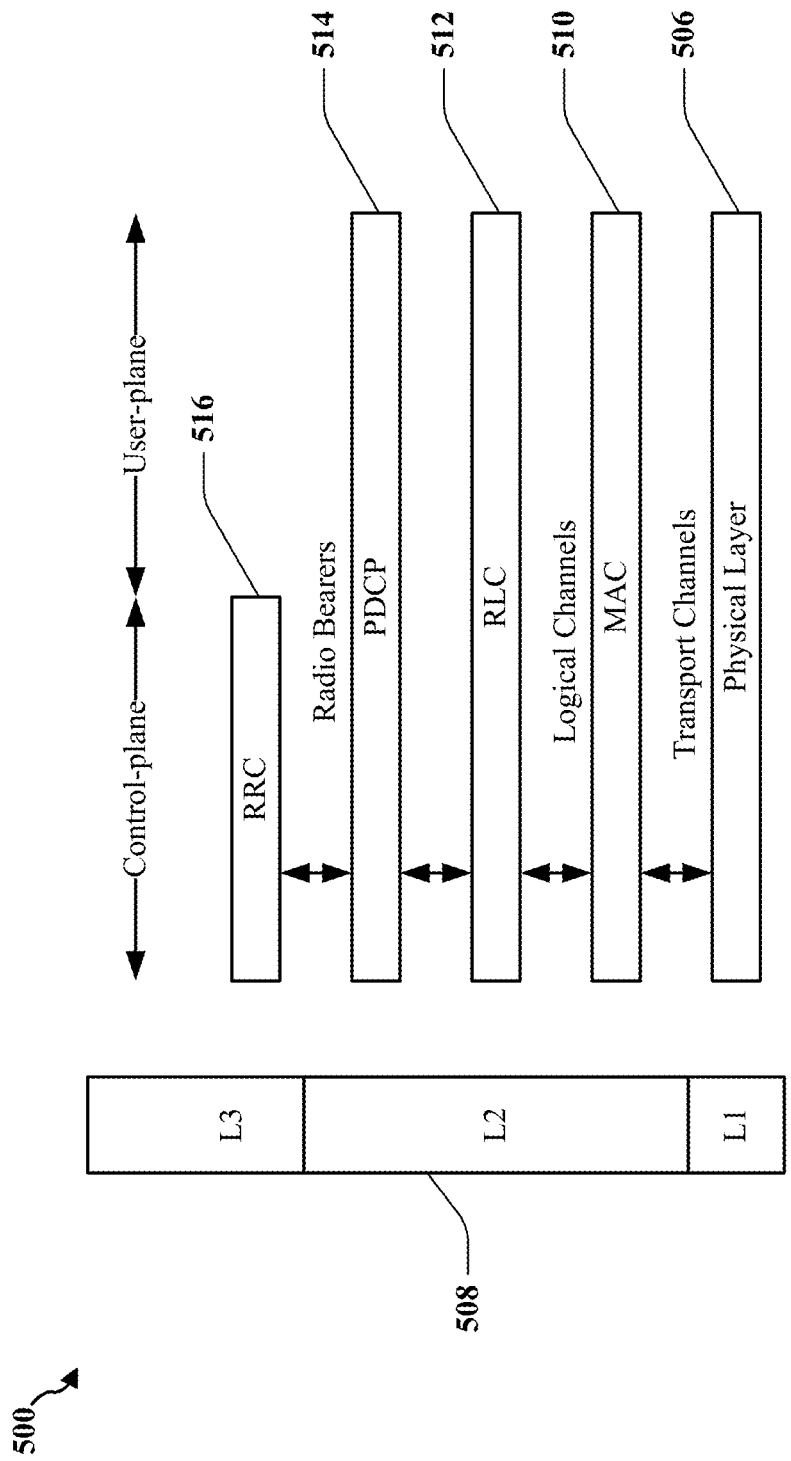
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
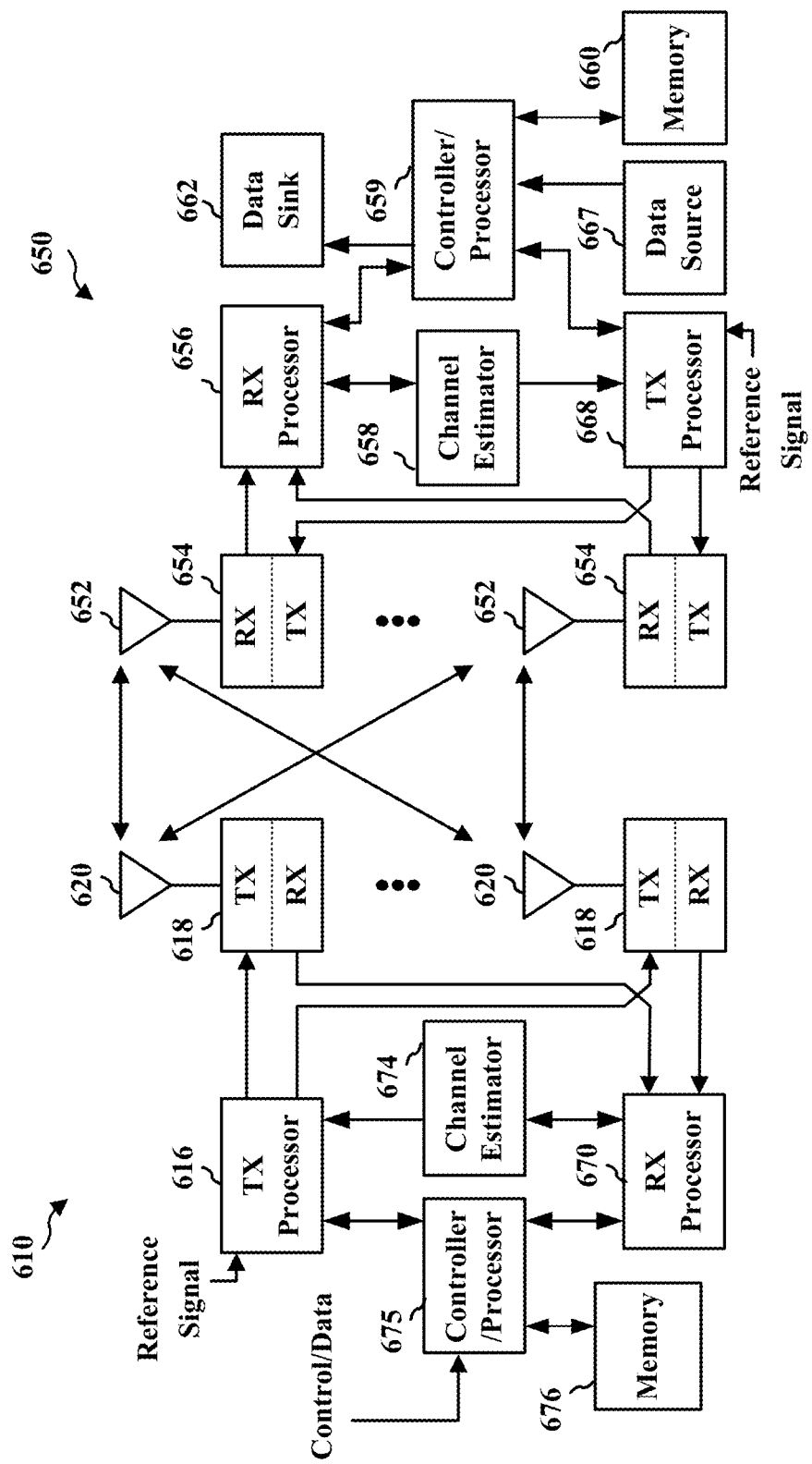
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
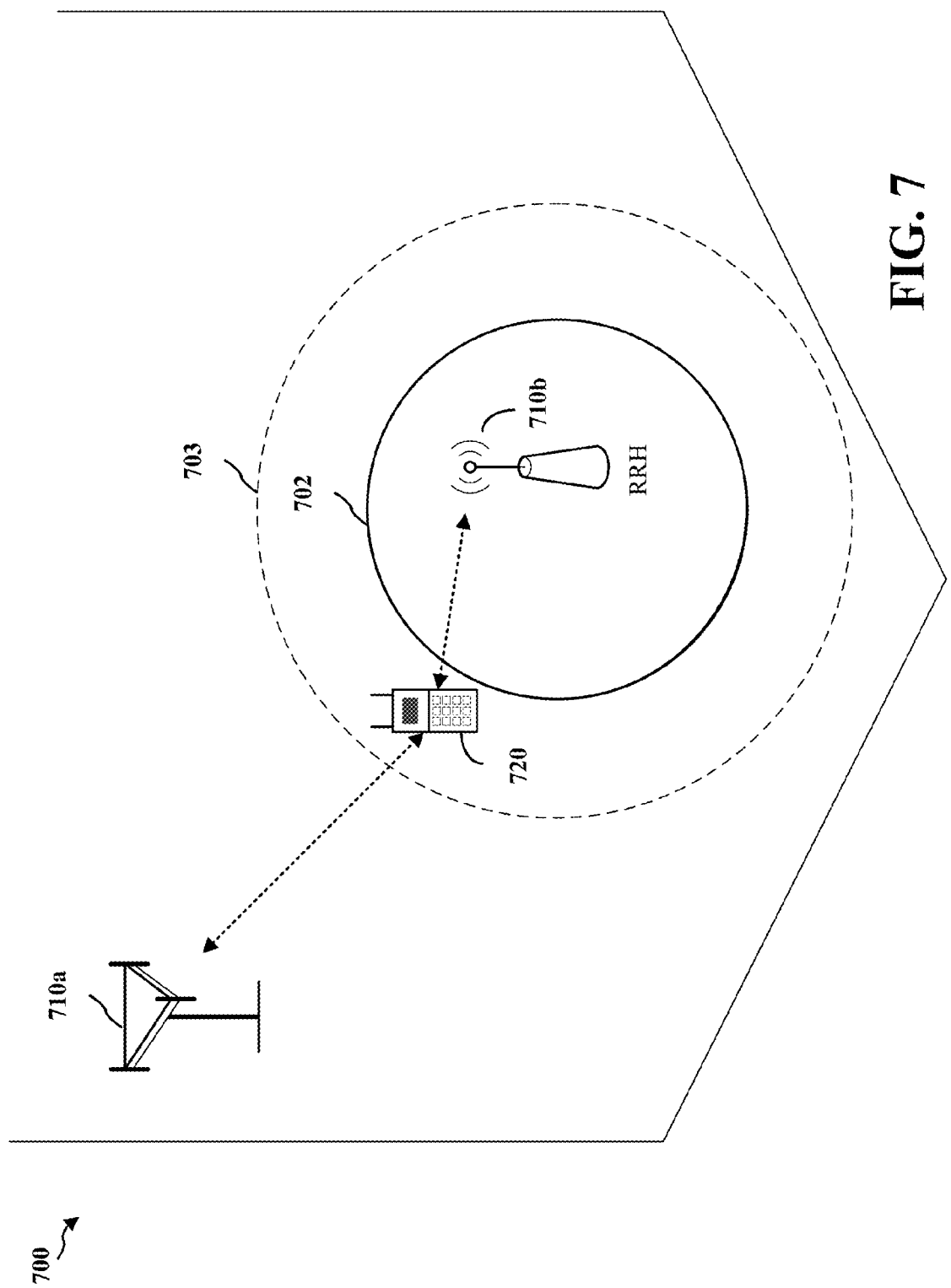
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710*b* may have a range expanded cellular region 703 that is expanded from the cellular region 702 through enhanced inter-cell interference coordination between the RRH 710*b* and the macro eNB 710*a* and through interference cancellation performed by the UE 720. In enhanced inter-cell interference coordination, the RRH 710*b* receives information from the macro eNB 710*a* regarding an interference condition of the UE 720. The information allows the RRH 710*b* to serve the UE 720 in the range expanded cellular region 703 and to accept a handoff of the UE 720 from the macro eNB 710*a* as the UE 720 enters the range expanded cellular region 703.

In some heterogeneous networks, serving cell decoding performance can be improved by processing interfering cells. Interfering cells may be processed to suppress, cancel or otherwise manage interference using any available techniques suitable for use with the radio access technologies employed in a heterogeneous network. The source of interference may include one or more base stations, repeaters, etc., that transmit a DL subframe comprising a plurality of REs, each RE representing an OFDM subcarrier in frequency and time. A UE may process all of the interferers corresponding to these REs to optimize decoding performance related to the serving cell. However, the complexity of the receiver of the UE may need to be increased in order to process each of the interferers for all of the REs in a subframe. Moreover, power usage at the UE may also need to be increased in order to process each of the interferers for all of the REs in a subframe.

Certain embodiments of the invention provide systems, apparatus and methods that employ a prioritization scheme that enables interfering channels to be processed with reduced receiver complexity. The prioritization scheme can reduce receiver complexity with minimal loss of performance by, for example, selectively skipping processing of certain interferers corresponding to certain REs during processing. Receiver complexity can be expressed as a function of chip area, processing delay, power consumption, memory usage, etc.

Priority may be assigned to pairs, referred to herein as TR-cell (TRC) pairs, each TRC pair corresponding to a target region and a current cell. For example, TRC pairs may be denoted as (TR_Idx, Cell_Idx). In an example where 5 target regions are defined and signals are received from 4 cells (including one serving cell and 3 interfering cells), a list of 20 ordered pairs may be represented as $(TR_i, Cell\_Idx_j)$. A priority may be assigned to each of the 20 target regions in the list, and the priorities may be updated as processing progresses. In some embodiments, the TR comprises a set of REs of all the cells corresponding to the same channel type.

Figure 8:
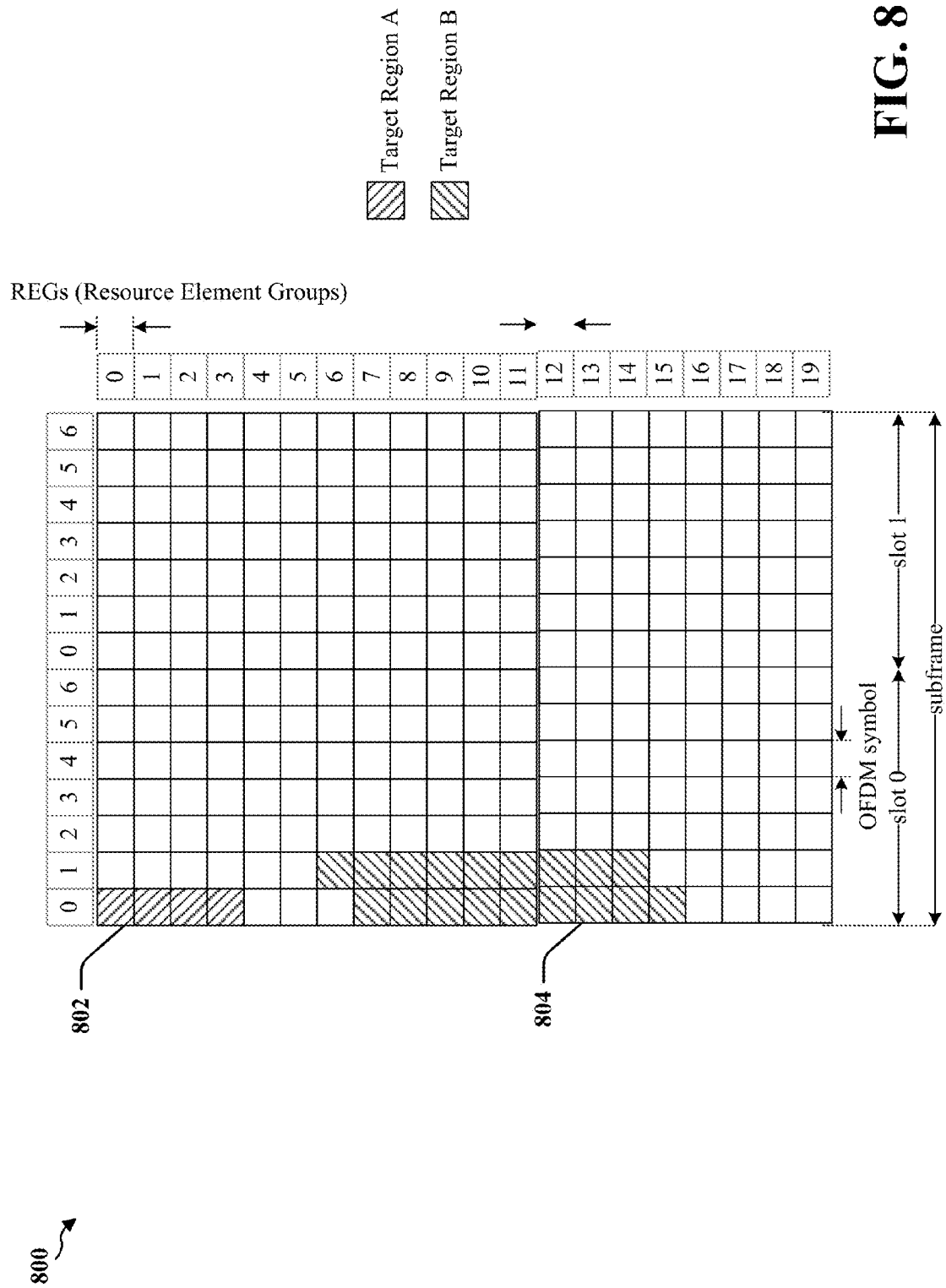
FIG. 8 is a diagram illustrating a simplified example of target regions in a DL frame structure in LTE.

FIG. 8 is a simplified representation depicting a subframe 800 as an array of resource elements. In some embodiments, each subframe 800 of the interfering cells and the serving cell is divided into TRs 802 and 804. Each TR 802 and 804 includes a set of REs. TRC pairs are formed from each TR 802 or 804 and the serving cell and from each TR 802 or 804 and each interfering cell. Each TRC pair is assigned an initial processing priority number at a start point, which may be defined as the beginning of each frame, each subframe 800, or each OFDM symbol. Certain TRC pairs 802 or 804 may be assigned a NULL priority value, indicating that the corresponding channel and/or resource element will not be processed for the corresponding cell.

Priority is typically assigned using pre-determined logic that is configured to optimize final serving cell decode performance with reduced complexity. Priority may be assigned as a function of several criteria, parameters and characteristics. For example, initial priority may be determined based on one or more of a Cell ID, reference signal received power (RSRP), and channel type. Priority may also be determined and/or adjusted based on information of prior TRC pairs corresponding to TRs 802 and 804 processed by the receiver.

In some embodiments, processing begins by selecting the TRC with the highest priority as the current TRC for processing. The priorities of the remaining TRCs may be reevaluated as needed after the current TRC is processed. Reevaluation of priorities in a new set of TRCs, representing the remaining unprocessed cells and TR 802 or 804 pairs, may be based on the result of processing the current TRC (i.e. the previous highest priority TRC). The TRC with the highest priority in the new set may be processed next. This procedure is repeated until all of the TRCs have been processed, or until all of the remaining TRCs are assigned a priority value NULL or a priority value below a threshold.

Alternatively, the procedure may be limited by timer. The timer may define the maximum time for TRC pair interference processing. In an aspect, interference processing may include interference cancellation. The timer may be set based on the processing time allocated for interference cancellation, a portion of the interference cancellation time, or a subframe processing time. Furthermore, TRC processing may be limited by other factors such as battery power, power consumption, and success rates in cancelling interference associated with certain frequency regions, subframe types, or interferers.

The number of REs processed for each interferer can be reduced by assigning NULL priorities to less significant TRCs in order to eliminate the REs in corresponding TRs 802 or 804 from processing. In one example, the assignment of a NULL priority to a TRC pair may be based on the presence of an almost blank subframe (ABS). An ABS typically comprises very low power control channel frames with no data traffic. A single ABS interfering cell may be cancelled by assigning highest priority to a TRC pair that includes TR 802 or 804 corresponding to physical control format indicator channel (PCFICH) and the interfering cell, thereby causing this TRC pair to be processed first. If no PCFICH is detected, then ABS is indicated and a NULL priority can be assigned to all other TRC pairs corresponding to the other TR, including PDCCH and PDSCH associated with the interfering cell. The determination of a TR (e.g., PCFICH region) in an example scenario involving a serving cell and two interfering cells will be described with reference to FIG. 9.

Figure 9:
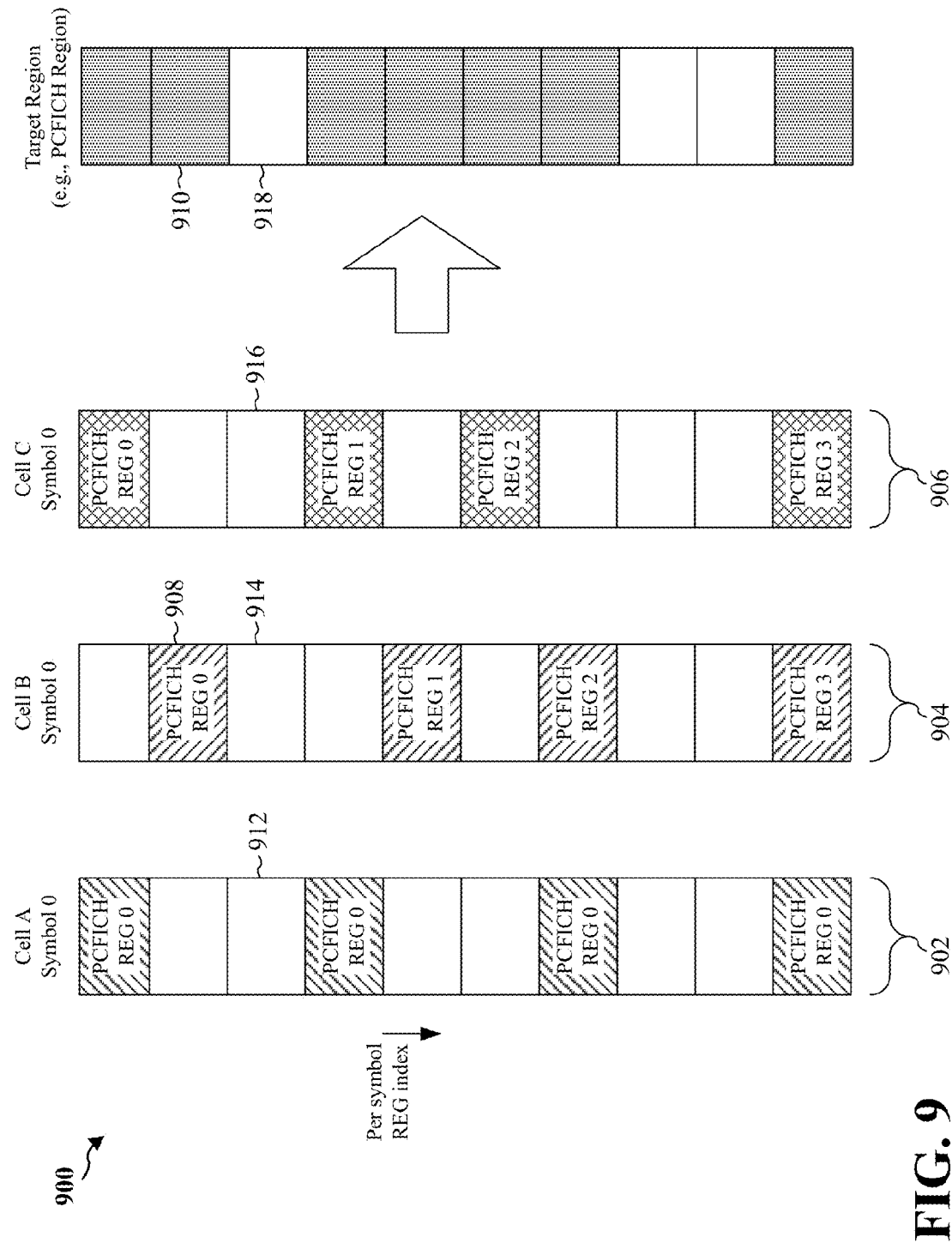
FIG. 9 is a diagram illustrating concurrent signal transmissions from a serving cell and two interfering cells.

FIG. 9 is a diagram 900 illustrating concurrent signal transmissions from a serving cell and two interfering cells. For example, the OFDM symbol 902 may be transmitted by a serving cell (e.g., "Cell A"), the OFDM symbol 904 may be transmitted by a first interfering cell (e.g., "Cell B"), and the OFDM symbol 906 may be transmitted by a second interfering cell (e.g., "Cell C"). In the configuration of FIG. 9, the OFDM symbols 902, 904, and 906 are all transmitted concurrently. As shown in FIG. 9, the OFDM symbols 902, 904, and 906 include PCFICH in various REs (e.g., RE 908). The target region (also referred to as "PCFICH region") may be determined by identifying any of the corresponding REs in the OFDM symbols 902, 904, and 906 that include PCFICH. For example, in FIG. 9, since RE 908 includes PCFICH, the corresponding RE 910 is included in the target region. As another example, since RE 912, RE 914, and RE 916 do not include PCFICH, the corresponding RE 918 is not included in the target region. Therefore, in FIG. 9, the REs included in the target region are indicated by the shaded regions.

Referring now to FIG. 8, in another example, PDSCH interference cancellation may be avoided by cancelling a single interfering cell that has a grant for UL only. The highest priority may be assigned to a TRC pair which includes TR 802 or 804 corresponding to PCFICH and the interfering cell. When PCFICH is decoded, the control span may be determined and the highest priority can be assigned to the TRC pair (TR 802 or 804) corresponding to PDCCH. The PDCCH may be processed to attempt to decode the type of grant. If it is determined that the grant is a UL grant, NULL priority can be assigned to the TR 802 or 804 corresponding to PDSCH. As a result of assigning a NULL priority to the TRC pair associated with PDSCH, the PDSCH may not be processed for the corresponding cell.

Multiple interfering cells may be present, and the interfering cells may exhibit different channel strengths. In performing interference cancellation, the TRC pairs having TRs of the stronger interfering cell may be assigned a higher priority than the priority assigned to a weaker interfering cell. The REs of the higher priority TR 802 or 804 may then be processed and interference cancellation may be performed on them. Based on the processing decision of each interfering cell, cell priorities can be changed and some TRC pairs corresponding to TRs 802 or 804 may be assigned NULL priority.

Figure 10:
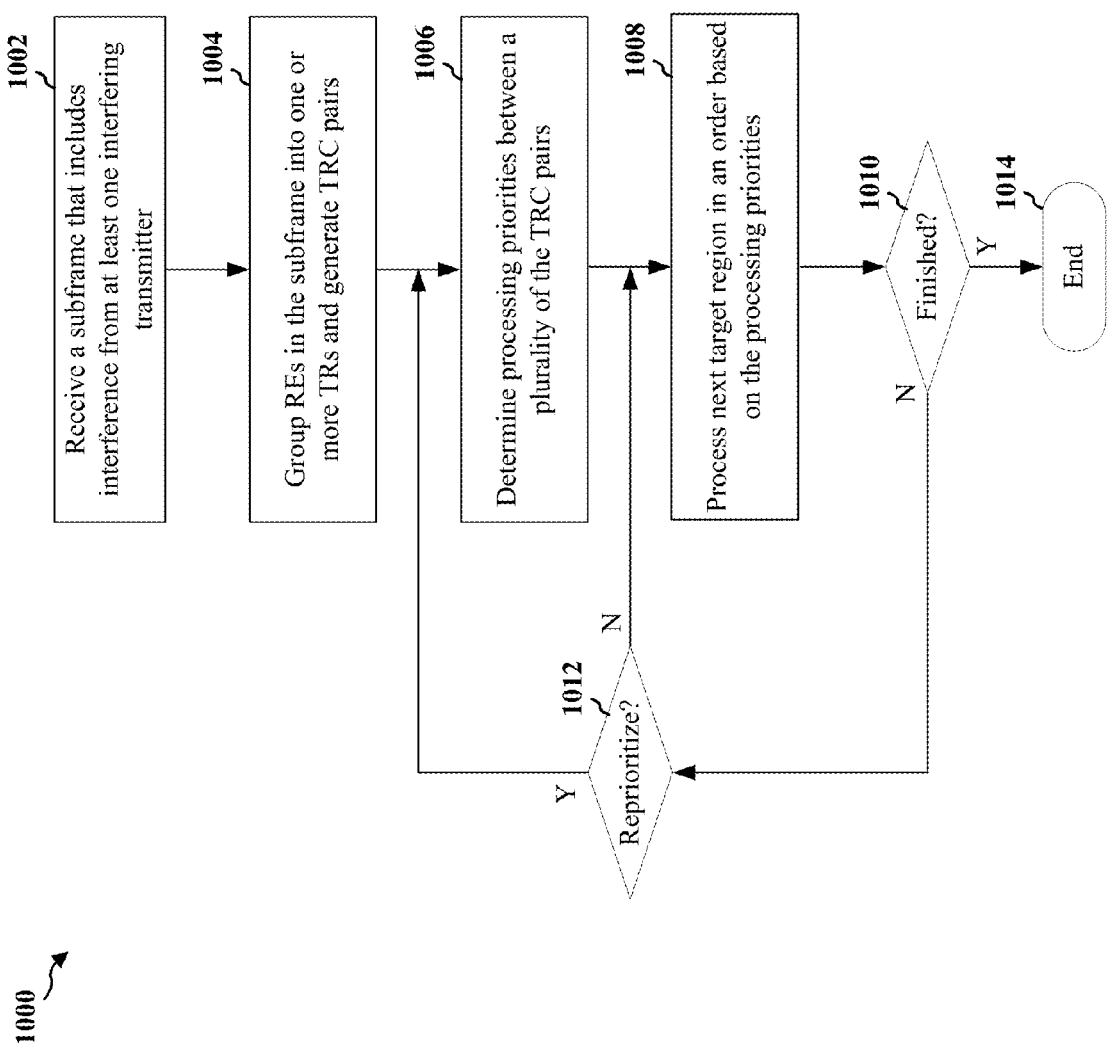
FIG. 10 is a flow chart of a method of wireless communication.

FIG. 10 is a flow chart 1000 of a method of wireless communication. The method may be performed by a UE 720. At step 1002, the UE 720 receives a subframe. The subframe may include interference from at least one interfering transmitter or cell.

At step 1004, the UE 720 groups REs in the subframe into one or more TRs. The grouping may be based on a criterion. Each of the target regions may be paired with each of the interfering transmitters and a serving cell, thereby generating a plurality of TRC pairs. For example, a TR may comprise REs that are allocated for a PDCCH or a PDSCH. As another example, a TR may comprise REs that are allocated for a PCFICH, or another control channel.

At step 1006, the UE 720 processing priorities of the TRC pairs are determined. The UE 720 may initialize priorities for TRC pairs based on a first signal received from a first interfering transmitter. The initialized priorities may be modified by the UE 720 based on a second signal received from a second interfering transmitter. In some embodiments, priorities for the TRC pairs may be initialized by assigning priorities based on the presence or absence of the first signal in the one or more TRs. In one example, the first signal is associated with REs including one or more of a physical downlink control channel, a physical downlink shared channel, and a physical control format indicator channel. For example, if the first or second signal is associated with REs allocated for the PCFICH, the UE 720 may initialize processing priorities for the TRC pairs by assigning a highest processing priority to a TRC pair having a TR that includes REs allocated for the PCFICH. For example, and as previously described with reference to FIG. 9, a TR (e.g., PCFICH region) including REs allocated for the PCFICH may be determined by identifying REs allocated for the PCFICH in OFDM symbols transmitted concurrently by a serving cell and/or one or more interfering cells. The TR that includes REs allocated for the PCFICH may be associated with one of the interfering transmitters or the serving cell.

In some embodiments, the priorities are initialized for TRC pairs based on a determination of relative power levels of the first signal and the second signal in the one or more TRs. In some embodiments, the UE 720 modifies the priorities for the TRC pairs by determining differences in power levels between the first signal and the second signal in one or more TRs. The power levels may be associated with one or more of a physical downlink control channel, a physical downlink shared channel, and a physical control format indicator channel.

In some embodiments, the priorities for the one or more TRC pairs may be modified by the UE 720 by assigning a higher priority to TRC pairs associated with a first interfering transmitter than the priority assigned to TRC pairs associated with a second interfering transmitter when a power level in the TRs associated with the first interfering transmitter is higher than a power level in the TRs associated with the second interfering transmitter.

At step 1008 the UE 720 processes TRs in an order based on the processing priorities of the TRC pairs.

At step 1010, the UE 720 determines if more TRs are to be processed and terminates at step 1014 if processing complete. The UE 720 may process an unprocessed TR associated with a TRC pair having the highest priority of the remaining TRC pairs. The UE 720 may determine that there are no further TRs for processing when only TRC pairs with NULL priority levels remain. The UE 720 may determine that there are no further TRs for processing when remaining TRC pairs have priority levels that are below a threshold value. The threshold value may be configured based on a tradeoff between cell decoding and interference cancellation overheads. The threshold value may be configured based on a power and/or memory usage and other such considerations.

If it is determined that more TRs are to be processed, then the UE 720 determines at step 1012 if reprioritization is to be performed at step 1006, and if not the UE 720 processes the next TR at step 1008, based on the priorities of the TRCs. The UE 720 may modify processing priorities of unprocessed TRC pairs at step 1006 based on a result of the processing of a prior TR. The UE 720 may modify the processing priorities of the remaining TRC pairs by assigning a NULL priority to TRC pairs when the result of processing a prior TR indicates an absence of a downlink grant. The UE 720 may modify the processing priorities of the remaining TRC pairs by assigning a NULL priority to TRC pairs when the result of processing a prior TR indicates an absence of one or more of a physical downlink control channel, a physical downlink shared channel, and a physical control format indicator channel.

Figure 11:
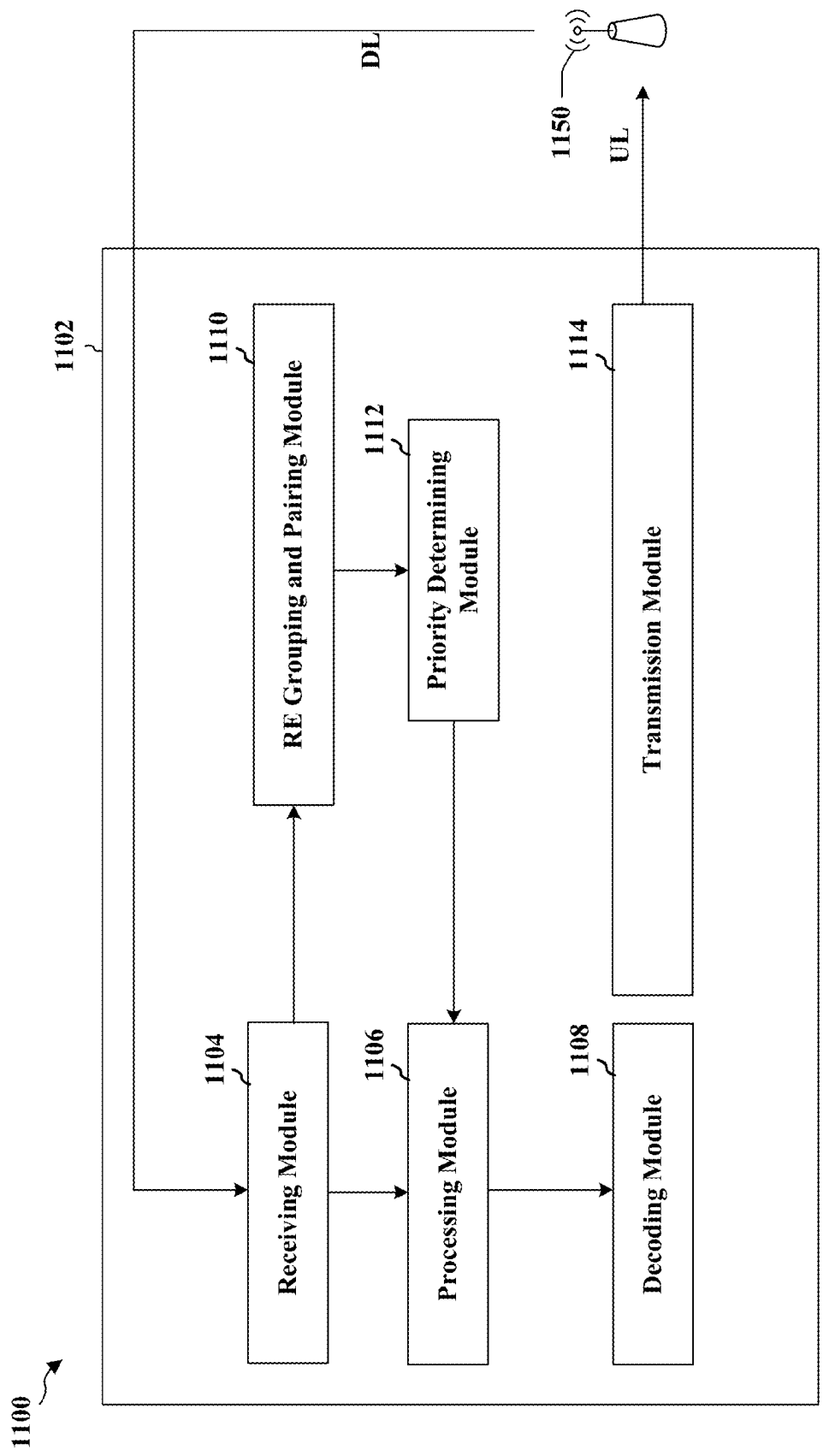
FIG. 11 is a conceptual data flow diagram illustrating the data flow between different modules/means/components in an exemplary apparatus.

FIG. 11 is a conceptual data flow diagram 1100 illustrating the data flow between different modules/means/components in an exemplary apparatus 1102. The apparatus may be a UE 720. The apparatus includes a module 1104 that receives DL subframes from an eNB 1150, module 1106 that processes REs in the subframes, a decoding module 1108 that decodes the subframes for use by the UE 720, a resource grouping and pairing module 1110 that identifies TRs in the subframes, a priority determining module 1112 that assigns processing priorities to the TRs and/or REs, and a transmission module 1114 that handles UL communications for the UE 720.

The apparatus may include additional modules that perform each of the steps of the algorithm in the aforementioned flow chart of FIG. 10. As such, each step in the aforementioned flow chart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
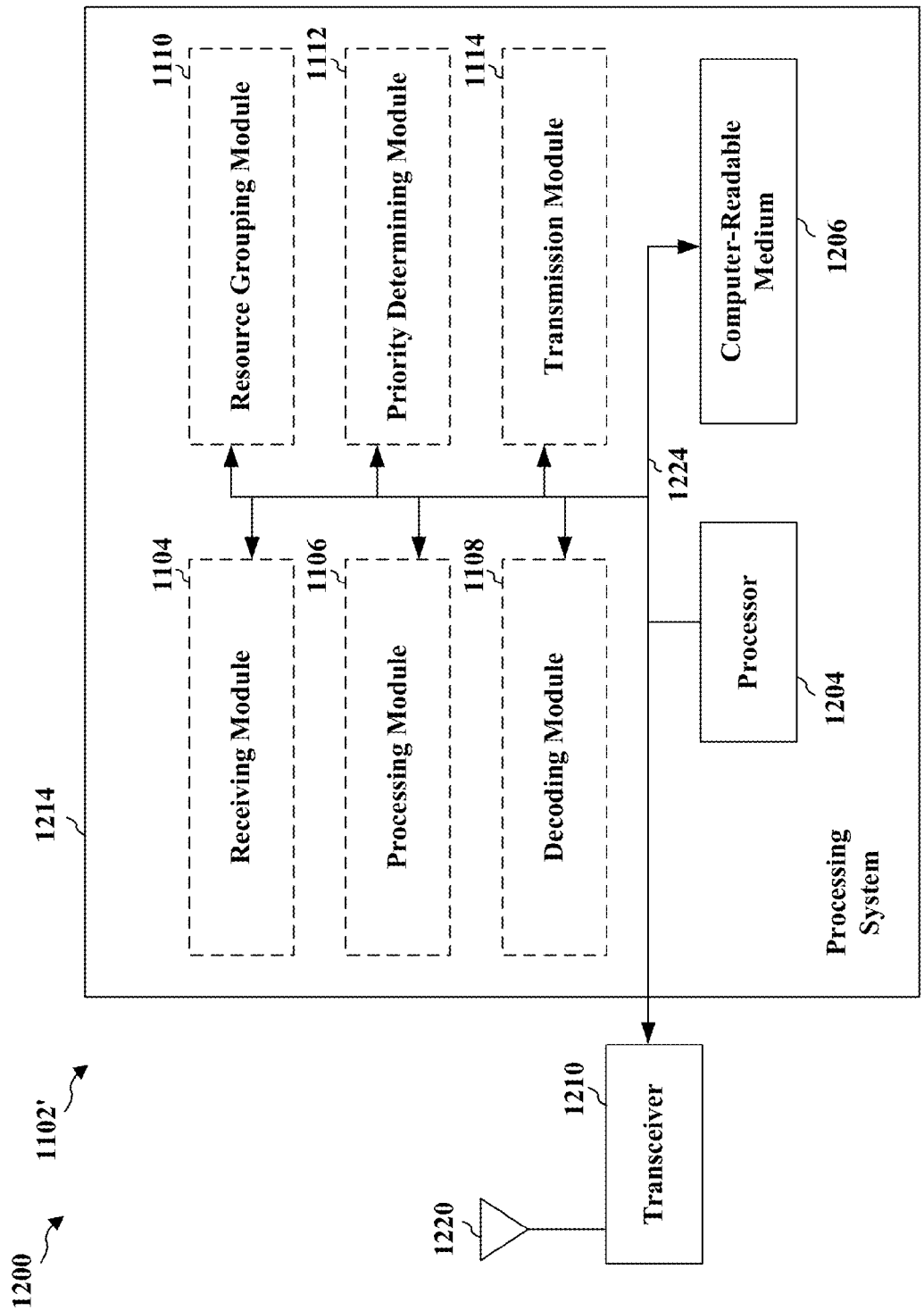
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1104, 1106, 1108, 1110, 1112, 1114 and the computer-readable medium 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The processing system 1214 includes a processor 1204 coupled to a computer-readable medium 1206. The processor 1204 is responsible for general processing, including the execution of software stored on the computer-readable medium 1206. The software, when executed by the processor 1204, causes the processing system 1214 to perform the various functions described supra for any particular apparatus. The computer-readable medium 1206 may also be used for storing data that is manipulated by the processor 1204 when executing software. The processing system further includes at least one of the modules 1104, 1106, 1108, 1110, 1112, and 1114. The modules may be software modules running in the processor 1204, resident/stored in the computer readable medium 1206, one or more hardware modules coupled to the processor 1204, or some combination thereof. The processing system 1214 may be a component of the UE 650 and may include the memory 660 and/or at least one of the TX processor 668, the RX processor 656, and the controller/processor 659.

In one configuration, the apparatus 1102/1102' for wireless communication includes receiving means 1104 for receiving a subframe, grouping and pairing means 1110 for identifying and/or grouping REs in the subframe into one or more TRs and pairing the TRs with serving and interfering cells, priority determination means 1112 for determining processing priorities between a plurality of the TRs, and processing means for processing selected TRs from the plurality of the TRs in an order based on the priorities. The apparatus 1102/1102' for wireless communication typically includes decoding means 1108 for decoding cells and transmission means 1114 for managing uplink communications.

The aforementioned means may be one or more of the aforementioned modules of the apparatus 1102 and/or the processing system 1214 of the apparatus 1102' configured to perform the functions recited by the aforementioned means. As described supra, the processing system 1214 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   receiving a subframe at a user equipment (UE), the subframe including interference from at least one interfering transmitter;
   grouping resource elements (REs) in the received subframe into one or more target regions (TRs) by the UE, the grouping being based on at least one criterion;
   generating a plurality of TR-cell (TRC) pairs by the UE, each TRC pair associating a target region from the one or more TRs with one of the at least one interfering transmitter or a serving cell;
   determining processing priorities for the plurality of pairs by the UE after generating the plurality of TRC pairs; and
   processing TRs in an order based on the processing priorities.

2. The method of claim 1, wherein generating the plurality of TRC pairs comprises pairing each of the one or more target regions with each of the at least one interfering transmitter and the serving cell.

3. The method of claim 1, wherein generating the plurality of TRC pairs comprises pairing each of the one or more target regions with one of the at least one interfering transmitter or the serving cell.

4. The method of claim 1, wherein a highest processing priority of the processing priorities is assigned to a TRC pair having a TR that includes REs comprising a physical control format indicator channel.

5. The method of claim 1, wherein at least one TR comprises REs that are allocated for one or more of a physical downlink control channel, a physical downlink shared channel, and the physical control format indicator channel.

6. The method of claim 1, wherein the step of determining processing priorities for the plurality of TRC pairs includes:
   initializing priorities for the plurality of TRC pairs based on a first signal received from a first interfering transmitter; and
   modifying the priorities for the plurality of TRC pairs based on a second signal received from a second interfering transmitter.

7. The method of claim 6, wherein the step of initializing priorities for the plurality of TRC pairs includes determining relative power levels of the first signal and the second signal in the one or more TRs.

8. The method of claim 6, wherein the step of initializing priorities for the plurality of TRC pairs includes assigning priorities based on the presence or absence of the first signal in the one or more TRs.

9. The method of claim 8, wherein the first signal is associated with REs comprising one or more of a physical downlink control channel, a physical downlink shared channel, and the physical control format indicator channel.

10. The method of claim 6, wherein the step of modifying the priorities for the plurality of TRC pairs includes determining differences in power levels between the first signal and the second signal in the one or more TRs.

11. The method of claim 10, wherein modifying the priorities for the plurality of TRC pairs includes assigning a higher priority to TRC pairs having TRs associated with a first interfering transmitter than the priority assigned to TRC pairs having TRs associated with a second interfering transmitter when a power level associated with the first interfering transmitter is higher than a power level associated with the second interfering transmitter.

12. The method of claim 1, wherein the step of processing TRs includes processing a TR of a highest priority TRC pair, and further comprising modifying processing priorities of the plurality of TRC pairs based on a result of the processing step.

13. The method of claim 12, wherein modifying the processing priorities of the plurality of TRC pairs includes assigning a NULL priority to TRs when the result of the processing step indicates an absence of one or more of a physical downlink control channel, a physical downlink shared channel, and the physical control format indicator channel.

14. An apparatus for wireless communication, comprising:
   means for receiving a subframe at a user equipment (UE), the subframe including interference from at least one interfering transmitter;
   means for grouping resource elements (REs) in the received subframe into one or more target regions (TRs) by the UE, the grouping being based on at least one criterion;
   means for generating a plurality of TR-cell (TRC) pairs by the UE, each TRC pair associating a target region from the one or more TRs with one of the at least one interfering transmitter or a serving cell;
   means for determining processing priorities for the plurality of TRC pairs by the UE after generating the plurality of TRC pairs; and
   means for processing TRs in an order based on the processing priorities.

15. The apparatus of claim 14, wherein generating the plurality of TRC pairs comprises pairing each of the one or more target regions with each of the at least one interfering transmitter and the serving cell.

16. The apparatus of claim 14, wherein generating the plurality of TRC pairs comprises pairing each of the one or more target regions with one of the at least one interfering transmitter or the serving cell.

17. The apparatus of claim 14, wherein a highest processing priority of the processing priorities is assigned to a TRC pair having a TR that includes REs comprising a physical control format indicator channel.

18. The apparatus of claim 14, wherein at least one TR comprises REs that are allocated for one or more of a physical downlink control channel, a physical downlink shared channel, and the physical control format indicator channel.

19. The apparatus of claim 14, wherein the means for determining processing priorities for the plurality of TRC pairs initializes priorities for the plurality of TRC pairs based on a first signal received from a first interfering transmitter, and modifies the priorities for the plurality of TRC pairs based on a second signal received from a second interfering transmitter.

20. The apparatus of claim 19, wherein the means for determining processing priorities for the plurality of TRC pairs determines relative power levels of the first signal and the second signal in the one or more TRs.

21. The apparatus of claim 19, wherein the means for determining processing priorities for the plurality of TRC pairs assigns priorities based on the presence or absence of the first signal in the one or more TRs.

22. The apparatus of claim 21, wherein the first signal is associated with REs comprising one or more of a physical downlink control channel, a physical downlink shared channel, and the physical control format indicator channel.

23. The apparatus of claim 19, wherein the means for determining processing priorities for the plurality of TRC pairs determines differences in power levels between the first signal and the second signal in the one or more TRs.

24. The apparatus of claim 23, wherein the means for determining processing priorities for the plurality of TRC pairs assigns a higher priority to TRC pairs having TRs associated with a first interfering transmitter than the priority assigned to TRC pairs having TRs associated with a second interfering transmitter when a power level associated with the first interfering transmitter is higher than a power level associated with the second interfering transmitter.

25. The apparatus of claim 14, wherein the means for processing selected TRs processes a TR of a highest priority TRC pair, and wherein the means for determining processing priorities modifies processing priorities of the plurality of TRC pairs based on a result of the processing step.

26. The apparatus of claim 25, wherein the processing priorities of the plurality of TRC pairs are modified by assigning a NULL priority to TRs when the result of the processing step indicates an absence of one or more of a physical downlink control channel, a physical downlink shared channel, and the physical control format indicator channel.

27. An apparatus for wireless communication, comprising:
    a memory; and
    at least one processor coupled to the memory and configured to:
        receive a subframe at a user equipment (UE), the subframe including interference from at least one interfering transmitter;
        group resource elements (REs) in the received subframe into one or more target regions (TRs) by the UE, the grouping being based on at least one criterion;
        generate a plurality of TR-cell (TRC) pairs by the UE, each TRC pair associating a target region from the one or more TRs with one of the at least one interfering transmitter or a serving cell;
        determine processing priorities for the plurality of TRC pairs by the UE after generating the plurality of TRC pairs; and
        process TRs in an order based on the processing priorities.

28. The apparatus of claim 27, wherein generating the plurality of TRC pairs comprises pairing each of the one or more target regions with each of the at least one interfering transmitter and the serving cell.

29. The apparatus of claim 27, wherein generating the plurality of TRC pairs comprises pairing each of the one or more target regions with one of the at least one interfering transmitter or the serving cell.

30. The apparatus of claim 27, wherein a highest processing priority of the processing priorities is assigned to a TRC pair having a TR that includes REs comprising a physical control format indicator channel.

31. The apparatus of claim 27, wherein at least one TR comprises REs that are allocated for one or more of a physical downlink control channel, a physical downlink shared channel, and the physical control format indicator channel.

32. The apparatus of claim 27, wherein processing priorities are determined for the plurality of TRC pairs by:
    initializing priorities for the plurality of TRC pairs based on a first signal received from a first interfering transmitter; and
    modifying the priorities for the plurality of TRC pairs based on a second signal received from a second interfering transmitter.

33. The apparatus of claim 32, wherein initializing priorities for the plurality of TRC pairs includes determining relative power levels of the first signal and the second signal in the one or more TRs.

34. The apparatus of claim 32, wherein initializing priorities for the plurality of TRC pairs includes assigning priorities based on the presence or absence of the first signal in the one or more TRs.

35. The apparatus of claim 34, wherein the first signal is associated with REs comprising one or more of a physical downlink control channel, a physical downlink shared channel, and the physical control format indicator channel.

36. The apparatus of claim 32, wherein the at least one processor is further configured to modify the priorities for the plurality of TRC pairs by determining differences in power levels between the first signal and the second signal in the one or more TRs.

37. The apparatus of claim 36, wherein the at least one processor is further configured to modify the priorities for the plurality of TRC pairs by assigning a higher priority to TRC pairs having TRs associated with a first interfering transmitter than the priority assigned to TRC pairs having TRs associated with a second interfering transmitter when a power level associated with the first interfering transmitter is higher than a power level associated with the second interfering transmitter.

38. The apparatus of claim 27, wherein the at least one processor is further configured to process selected target regions by processing a TR of a highest priority TRC pair, and wherein the processing system is further configured to modify processing priorities of the plurality of TRC pairs based on a result of the processing step.

39. The apparatus of claim 38, wherein the at least one processor is further configured to modify the processing priorities of the plurality of TRC pairs by assigning a NULL priority to TRs when the result of the processing step indicates an absence of one or more of a physical downlink control channel, a physical downlink shared channel, and the physical control format indicator channel.

40. A non-transitory computer-readable medium storing computer executable code for wireless communication, comprising, code for:
 receiving a subframe at a user equipment (UE), the subframe including interference from at least one interfering transmitter;
 grouping resource elements (REs) in the received subframe into one or more target regions (TRs) by the UE, the grouping being based on at least one criterion;
 generating a plurality of TR-cell (TRC) pairs by the UE, each TRC pair associating a target region from the one or more TRs with one of the at least one interfering transmitter or a serving cell;
 determining processing priorities for the plurality of TRC pairs by the UE after generating the plurality of TRC pairs; and
 processing TRs in an order based on the processing priorities.

41. The computer-readable medium of claim 40, wherein generating the plurality of TRC pairs comprises pairing each of the one or more target regions with each of the at least one interfering transmitter and the serving cell.

42. The computer-readable medium of claim 40, wherein generating the plurality of TRC pairs comprises pairing each of the one or more target regions with one of the at least one interfering transmitter or the serving cell.

43. The computer-readable medium of claim 40, wherein a highest processing priority of the processing priorities is assigned to a TRC pair having a TR that includes REs comprising a physical control format indicator channel.

44. The computer-readable medium of claim 40, wherein at least one TR comprises REs that are allocated for one or more of a physical downlink control channel, a physical downlink shared channel, and the physical control format indicator channel.

45. The computer-readable medium of claim 40, wherein the code for determining processing priorities for the plurality of TRC pairs includes code for:
 initializing priorities for the plurality of TRC pairs based on a first signal received from a first interfering transmitter; and
 modifying the priorities for the plurality of TRC pairs based on a second signal received from a second interfering transmitter.

46. The computer-readable medium of claim 45, wherein the code for initializing priorities for the plurality of TRC pairs includes code for determining relative power levels of the first signal and the second signal in the one or more TRs.

47. The computer-readable medium of claim 45, wherein the code for initializing priorities for the plurality of TRC pairs includes code for assigning priorities based on the presence or absence of the first signal in the one or more TRs.

48. The computer-readable medium of claim 47, wherein the first signal is associated with REs comprising one or more of a physical downlink control channel, a physical downlink shared channel, and the physical control format indicator channel.

49. The computer-readable medium of claim 45, wherein the code for modifying the priorities for the plurality of TRC pairs includes code for determining differences in power levels between the first signal and the second signal in the one or more TRs.

50. The computer-readable medium of claim 49, wherein the code for modifying the priorities for the plurality of TRC pairs includes code for assigning a higher priority to TRC pairs having TRs associated with a first interfering transmitter than the priority assigned to TRC pairs having TRs associated with a second interfering transmitter when a power level associated with the first interfering transmitter is higher than a power level associated with the second interfering transmitter.

51. The computer-readable medium of claim 40, wherein the code for processing selected target regions includes code for processing a TR of a highest priority TRC pair, and further comprising code for modifying processing priorities of the plurality of TRC pairs based on a result of the processing step.

52. The computer-readable medium of claim 51, wherein the code for modifying the processing priorities of the plurality of TRC pairs includes code for assigning a NULL priority to TRs when the result of the processing step indicates an absence of one or more of a physical downlink control channel, a physical downlink shared channel, and the physical control format indicator channel.

* * * * *